United States Patent
Beaucaire et al.

(10) Patent No.: US 8,306,710 B2
(45) Date of Patent: Nov. 6, 2012

(54) METHOD FOR DIESEL PARTICULATE FILTER REGENERATION IN A VEHICLE EQUIPPED WITH A HYBRID ENGINE BACKGROUND OF THE INVENTION

(75) Inventors: James T. Beaucaire, Wheaton, IL (US); David V. Rodgers, Bloomingdale, IL (US); Paul A. Wieshuber, River Grove, IL (US); Michael A. Majewski, Joliet, IL (US); Paul L. Berke, Chicago, IL (US)

(73) Assignee: International Engine Intellectual Property Company, LLC, Lisle, IL (US)

( * ) Notice: Subject to any disclaimer, the term of this patent is extended or adjusted under 35 U.S.C. 154(b) by 316 days.

(21) Appl. No.: 12/759,727

(22) Filed: Apr. 14, 2010

(65) Prior Publication Data
US 2011/0257821 A1 Oct. 20, 2011

(51) Int. Cl.
*F01N 11/00* (2006.01)
(52) U.S. Cl. .............................. 701/54; 701/22; 60/295
(58) Field of Classification Search .................. 701/22, 701/54; 60/285, 295
See application file for complete search history.

(56) References Cited

U.S. PATENT DOCUMENTS

| | | | |
|---|---|---|---|
| 4,809,177 A | 2/1989 | Windle | |
| 4,926,331 A | 5/1990 | Windle | |
| 5,017,916 A | 5/1991 | Londt | |
| 5,018,087 A | 5/1991 | Dannenberg | |
| 5,365,436 A | 11/1994 | Schaller | |
| 5,566,774 A * | 10/1996 | Yoshida | 180/65.245 |
| 6,016,459 A | 1/2000 | Isaac | |
| 6,112,138 A | 8/2000 | Dannenberg | |
| 6,188,948 B1 | 2/2001 | Shivler | |
| 6,263,269 B1 | 7/2001 | Dannenberg | |
| 6,272,402 B1 | 8/2001 | Kelwaski | |
| 6,313,742 B1 | 11/2001 | Larson | |
| 6,356,822 B1 | 3/2002 | Diaz | |
| 6,401,700 B2 | 6/2002 | Balekai | |
| 6,430,485 B1 | 8/2002 | Hullinger | |
| 6,431,304 B1 | 8/2002 | Smythe | |
| 6,584,391 B2 | 6/2003 | Lack | |
| 6,618,665 B2 | 9/2003 | Walker | |
| 6,654,678 B1 | 11/2003 | Rodriguez | |
| 6,698,409 B1 | 3/2004 | Kennedy | |
| 6,724,102 B1 | 4/2004 | Kelwaski | |
| 6,725,147 B2 | 4/2004 | Mollin | |
| 6,738,701 B2 | 5/2004 | Wilson | |
| 6,801,846 B1 | 10/2004 | Rodriguez | |
| 6,842,676 B2 | 1/2005 | Rodriguez | |
| 6,850,832 B1 | 2/2005 | Rodriguez | |
| 6,907,445 B2 | 6/2005 | Pellegrino | |
| 6,934,619 B2 | 8/2005 | Read | |
| 6,947,822 B2 | 9/2005 | Martinez, Jr. | |
| 6,947,832 B2 | 9/2005 | Rodriguez | |
| 6,973,382 B2 | 12/2005 | Rodriguez | |

(Continued)

*Primary Examiner* — Joseph C Rodriguez
(74) *Attorney, Agent, or Firm* — Mark C. Bach; Jeffrey P. Calfa

(57) ABSTRACT

The method for regeneration of a diesel particulate filter of a vehicle equipped with a hybrid engine, wherein the temperature of the exhaust exiting the diesel engine is increased above a predetermined level by increasing load thereon, through optimization of interaction between the diesel particulate filter aftertreatment system and the hybrid engine control through messaging via a communication bus is disclosed. The load on the engine may be increased with or without the assistance of the electric motor/generator of the hybrid engine, and will not affect required acceleration/deceleration of the vehicle.

6 Claims, 1 Drawing Sheet

U.S. PATENT DOCUMENTS

| | | |
|---|---|---|
| 6,985,808 B1 | 1/2006 | Kennedy |
| 6,988,029 B1 | 1/2006 | Kennedy |
| 6,990,951 B1 | 1/2006 | Liu |
| 6,993,428 B1 | 1/2006 | Gundrum |
| 7,000,393 B1 | 2/2006 | Wood |
| 7,013,212 B1 | 3/2006 | de Ojeda |
| 7,047,953 B2 | 5/2006 | Kennedy |
| 7,058,502 B2 | 6/2006 | Rodgers |
| 7,130,736 B2 | 10/2006 | Bishop |
| 7,184,877 B1 | 2/2007 | de Ojeda |
| 7,200,485 B2 | 4/2007 | Kennedy |
| 7,277,791 B2 | 10/2007 | Petrosius |
| 7,289,899 B2 | 10/2007 | Rodriguez |
| 7,292,930 B2 | 11/2007 | Zhang |
| 7,349,798 B2 | 3/2008 | Beyene |
| 7,433,776 B1 | 10/2008 | Hunter |
| 7,461,627 B2 | 12/2008 | Liu |
| 7,530,220 B2 | 5/2009 | Miller |
| 7,536,992 B1 | 5/2009 | Wieshuber |
| 7,584,607 B2 * | 9/2009 | Samuelsen et al. ............ 60/295 |
| 7,748,214 B2 * | 7/2010 | Ishii et al. ...................... 60/295 |
| 8,001,772 B2 * | 8/2011 | Nishizawa et al. ............. 60/295 |
| 8,020,372 B2 * | 9/2011 | Mullins et al. .................. 60/285 |
| 8,042,325 B2 * | 10/2011 | Cicala et al. .................... 60/285 |
| 2003/0145582 A1 * | 8/2003 | Bunting et al. ................. 60/297 |
| 2004/0069281 A1 | 4/2004 | Corba |
| 2004/0181325 A1 | 9/2004 | Rodriguez |
| 2005/0075779 A1 | 4/2005 | Read |
| 2005/0114002 A1 | 5/2005 | Rodgers |
| 2005/0177301 A1 | 8/2005 | Bishop |
| 2005/0177302 A1 | 8/2005 | Rodriguez |
| 2005/0216174 A1 | 9/2005 | Rodriguez |
| 2005/0288846 A1 | 12/2005 | Liu |
| 2006/0005805 A1 | 1/2006 | Liu |
| 2006/0064229 A1 | 3/2006 | Kennedy |
| 2006/0112679 A1 * | 6/2006 | Kojima et al. .................. 60/278 |
| 2006/0185353 A1 | 8/2006 | Liu |
| 2006/0200297 A1 | 9/2006 | Liu |
| 2007/0084427 A1 | 4/2007 | Petrosius |
| 2007/0129876 A1 | 6/2007 | Zhang |
| 2007/0204601 A1 * | 9/2007 | Ishii et al. ...................... 60/295 |
| 2008/0027618 A1 | 1/2008 | Liu |
| 2008/0154478 A1 | 6/2008 | Lyons |
| 2008/0184696 A1 | 8/2008 | Wyatt |
| 2008/0276602 A1 * | 11/2008 | McCabe et al. ................. 60/295 |
| 2008/0319599 A1 | 12/2008 | Ptak |
| 2010/0004812 A1 | 1/2010 | Merrick |
| 2010/0030452 A1 | 2/2010 | Rodriguez |
| 2011/0197568 A1 * | 8/2011 | Beaucaire et al. ............. 60/286 |

* cited by examiner

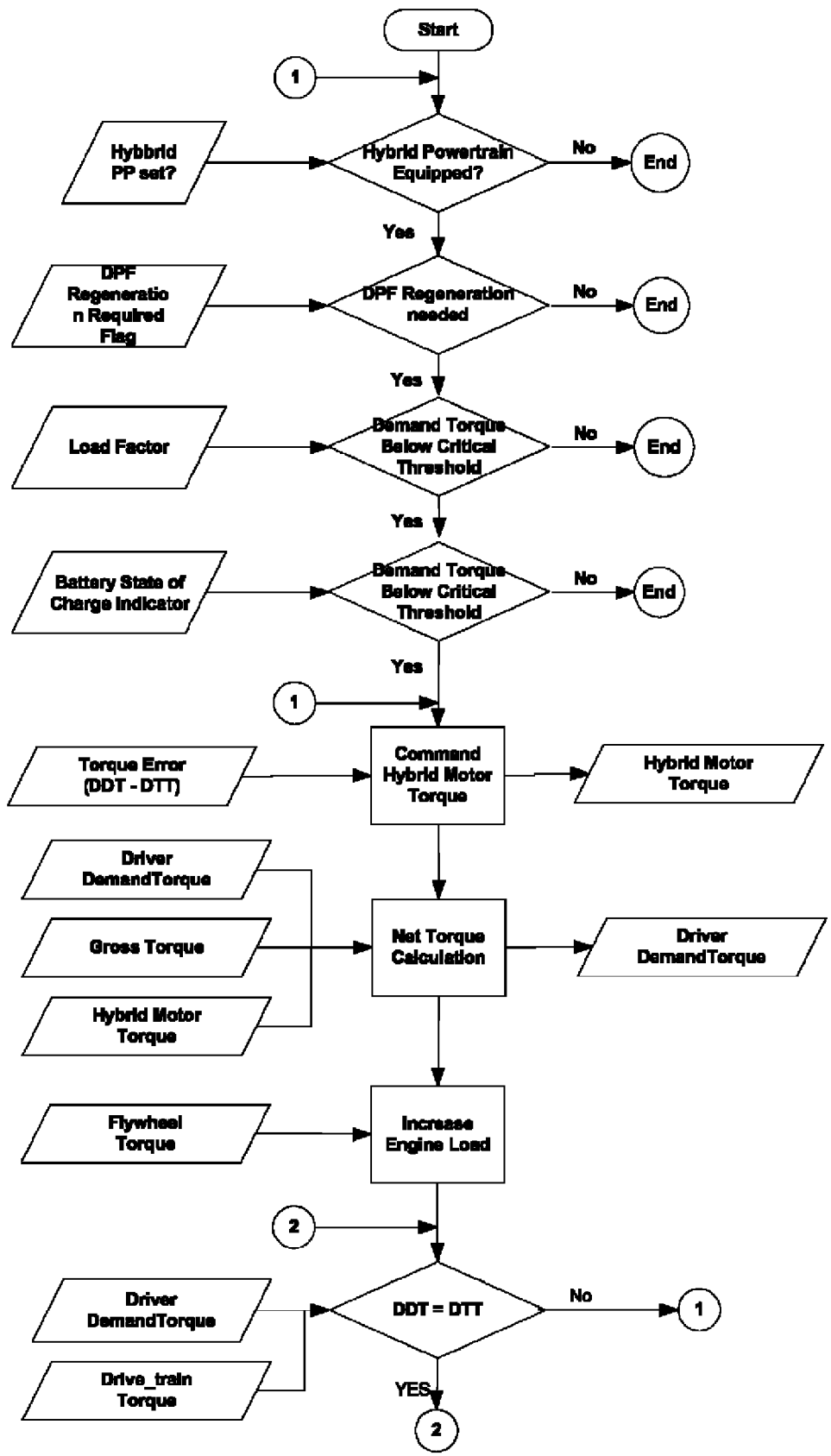

METHOD FOR DIESEL PARTICULATE FILTER REGENERATION IN A VEHICLE EQUIPPED WITH A HYBRID ENGINE

BACKGROUND OF THE INVENTION

1. Field of the Invention

The present disclosure relates to a method for diesel particulate filter regeneration. More specifically, the method relates to diesel particulate filter regeneration in a vehicle equipped with a hybrid power train.

2. Prior Art

There is no known prior art related to this method for diesel particulate filter regeneration in a vehicle equipped with a hybrid power train.

SUMMARY OF THE INVENTION

Provided is a method for regeneration of a diesel particulate filter of a vehicle equipped with a hybrid power train, wherein the temperature of the exhaust exiting a diesel engine is increased above a predetermined level by increasing load on the diesel engine when regeneration occurs. Interaction between the diesel particulate filter aftertreatment system and the hybrid power train is controlled through messaging via a communication bus. The load on the diesel engine may be increased with or without the assistance of the electric motor of the hybrid power train and will not affect accelerator/deceleration of the vehicle.

BRIEF DESCRIPTION OF THE DRAWING

FIG. 1 presents a logic flow diagram of the steps of the method of the present invention.

DESCRIPTION OF THE PREFERRED EMBODIMENT

Referring now to FIG. 1 in greater detail, a representative embodiment of the present method provides a solution for particulate filter regeneration in a vehicle provided with a hybrid power train and involves messaging over a communication bus to indicate that regeneration is required. Such messaging will ultimately increase or maintain the load on a diesel engine allowing for increase or maintenance of exhaust temperature as required for regeneration.

The diesel particulate filter (DPF) undergoes regeneration in response to filter flow being reduced due to soot build up within the DPF. During normal operating conditions, a hybrid power train, in which load is allocated between a diesel engine and an electric motor/generator, may not always produce exhaust temperatures hot enough to accomplish regeneration of the DPF. The present method will request that the electric motor/generator act as a generator to increase load to the diesel engine during regeneration in order to rapidly increase exhaust temperatures required for regeneration, if the battery pack of the vehicle is below maximum charge, which will result in a decrease in time required to regenerate the diesel particulate filter. If, on the other hand, the charge on the battery pack is at maximum, the logic will shut down the electric motor/generator until regeneration is no longer necessary, and the load will be completely transferred to the diesel engine, again decreasing the time taken to regenerate the DPF. The method optimizes interactions between the DPF aftertreatment system and the hybrid power train control (ECM). If the battery pack is at a maximum and the after treatment system is equipped with a resistive element the heating element can be activated thereby heating the feedstream gas to the aftertreatment inlet and providing a uniform load on the engine. The affect will be to maintain maximum battery charge and reduce the duration of the regeneration event and associated emissions.

It will be understood that the regeneration is accomplished by getting the exhaust temperature hot enough, long enough to burn off the soot that has accumulated in the filter. The higher the load on the diesel engine, the hotter the exhaust and the faster the filter is cleared. The addition of an optional heating element can promote this action during initial heating phase.

It will further be understood that when the vehicle is equipped with such hybrid power train, and the electric motor/generator is assisting the diesel engine in motor mode, load is taken away from the diesel engine because the electric motor/generator thereof is "sharing" the load with the diesel engine.

It will be further understood that the method sends and receives information or data via a communication bus.

An overview and explanation of what occurs are found in the flowchart of FIG. 1 and as set forth below.

Step 1. The logic of the method starts.

Step 2. The logic first determines if the vehicle is equipped with a hybrid power train. If not, the logic moves on to Step 3. If so, the logic moves on to Step 4A.

Step 3. The logic ends. It will be understood that each time the logic ends within this scheme, the hybrid power train reverts to its hybrid operation, with the electric motor sharing the load with the diesel engine, as necessary.

Step 4A. The logic next checks to see if a regeneration of the Diesel Particulate Filter (DPF) is needed. The determination is based on sensing for a pressure drop across the DPF continually at Step 4B. It will be understood that, as the filter accumulates soot, the passages there through become plugged, producing a pressure drop, due to a restriction in through flow. When the sensed pressure drop becomes greater than a threshold, a flag is set at Step 4B indicating that regeneration of the DPF is required. If no flag is set, the logic moves on to Step 5. If the flag is set, the logic moves on to Step 6A.

Step 5. The logic ends.

Step 6A. Here the logic determines if the load factor on the diesel engine is below a critical threshold for DPF regeneration from a sensing of the instantaneous load factor at Step 6B. If not, the logic proceeds to Step 7. If so, it will be understood that the exhaust will not get hot enough to clean the DPF and the logic proceeds to Step 8A.

Step 7. The logic ends.

Step 8A. Once it is determined that the load factor on the diesel engine is below the critical level, the logic determines the state of charge on the battery pack that is connected to the electric motor/generator of the hybrid power train from sensing the state of battery charge at Step 8B. If the battery pack is at full charge, the electric motor/generator cannot be used as a generator because the battery pack will be damaged by overcharging thereof and the logic proceeds to Step 9. If the charge on the battery pack is below full charge, the logic proceeds to Step 10A.

Step 9. The logic causes the electric motor/generator to be disabled and the additional load previously shared by the electric motor is returned to the diesel engine to produce a load factor over the critical threshold, the vehicle reverting to a "non-hybrid", diesel engine configuration while the regeneration of the DPF is occurring to ensure the load factor stays above the critical threshold for such regeneration. If the electric motor/generator is disabled, the logic intermittently moves on to Step 14.

Step 10A. If the battery pack is not at maximum charge, the electric motor/generator is utilized as a generator to charge the battery pack at Step 10C and to apply an additional load to the diesel engine by commanding the electric motor/generator on, which causes the electric motor/generator to absorb torque from the diesel engine, creating a "torque error" as sensed at Step 10B, and the logic moves on to Step 11A.

Step 11A. At this step, the logic computes the torque output of the diesel engine from an input of the DDT at Step 11B and an input of the torque absorbed by the electric motor/generator, acting as a generator, at Step 11C, by subtracting the absorbed torque input (negative torque) from the DDT input, to obtain a higher value, which higher value of diesel engine torque must be decreased to maintain the DDT at the required level. The logic then moves on to Step 11D.

Step 11D. Here the "extra" torque required as calculated at Step 11A, to maintain the Driver's Demand Torque (DDT) constant is output to the engine control module (ECM) The logic moves on to Step 12.

Step 12. The load on the diesel engine is increased by the amount the electric motor/generator is absorbing there from, as determined at Step 11D, to maintain the Driver's Demand Torque (DDT) constant and the logic moves on to Step 13.

Step 13A. If Drive/Power Train Torque (DTT) equals Driver's Demand Torque (DDT) (DTT=DDT) as determined from a sensing of DDT at Step 13B and DTT at Step 13C, then nothing need change and the logic circles back to Point 2. Alternatively, if DTT does not equal DDT, the logic circles back to Point 1, as the method needs to be stepped through again to determine what has changed.

Step 14. Here, as follows Step 9 described above, when the electric motor/generator has been disabled, the logic polls the PDF regeneration required input intermittently to see if regeneration is still required. If so, the logic returns to Point 1. If not, the logic moves on to Step 15. Step 15. The logic commands the electric motor/generator to turn back on and the logic moves on to Step 16.

Step 16. The logic ends.

As described above, the method of the present invention provides a number of advantages, some of which have been described above and others of which are inherent in the invention. Also, modifications may be proposed to the method without departing from the teachings herein. Accordingly, the scope of the invention is only to be limited as necessitated by the accompanying claims.

The invention claimed is:

1. A method for regeneration of a diesel particulate filter for a hybrid power train including a diesel engine and an electric motor/generator where the diesel particulate filter is fluidically connected to pass exhaust gas from the diesel engine, the method comprising the steps of:
   periodically initiating regeneration of the diesel particulate filter;
   responsive to initiation of regeneration determining if the load carried by the diesel engine is sufficient to produce exhaust gas having a temperature sufficiently high for a sufficient period of time to clear the diesel particulate filter of particulate matter; and if not;
   increasing the load on the diesel engine;
   continuing to match hybrid power train output torque to driver demand torque; and
   further steps responsive to the electric motor/generator reaching or being at a maximum level of charge of either disabling the electric motor/generator, or converting electrical current from the electric motor/generator into thermal energy and injecting the thermal energy into the diesel particulate filter.

2. The method of claim 1 where the step of increasing the load on the diesel engine includes operating the electric motor/generator as a generator.

3. The method of claim 2 wherein the step of operating the electric motor/generator as a generator includes applying charge to a battery pack of the vehicle responsive to the charge on the battery pack being below maximum level.

4. The method of claim 2 wherein the step of increasing includes dynamically adjusting the load on the diesel engine in an amount equal to the amount of load subtracted therefrom by operation of the electric motor/generator as a generator in order to maintain drive train torque at an amount equal to an amount of driver demand torque.

5. The method of claim 1 further comprising disabling the electric motor/generator during diesel particulate filter regeneration.

6. The method of claim 5 further comprising enabling the electric motor/generator responsive to completion of diesel particulate filter regeneration.

\* \* \* \* \*